United States Patent [19]

Lonsinger et al.

[11] Patent Number: 5,642,488

[45] Date of Patent: Jun. 24, 1997

[54] METHOD AND APPARATUS FOR A HOST COMPUTER TO STAGE A PLURALITY OF TERMINAL ADDRESSES

[75] Inventors: Richard Ellis Lonsinger, Parker, Colo.; James Harry Cook, Broken Arrow, Okla.

[73] Assignee: American Airlines, Inc., DFW Airport, Tex.

[21] Appl. No.: 247,271

[22] Filed: May 23, 1994

[51] Int. Cl.$^6$ .............................. G06F 9/00; G06F 13/18
[52] U.S. Cl. .................. 395/284; 395/200.1; 395/200.06; 395/829; 395/485; 395/294
[58] Field of Search ...................... 395/284, 200.1, 395/200.06, 829, 860, 862, 864, 287; 340/825.01

[56] References Cited

U.S. PATENT DOCUMENTS

| | | | |
|---|---|---|---|
| 3,701,109 | 10/1972 | Peters | 340/825.51 |
| 3,818,447 | 6/1974 | Craft | 395/732 |
| 3,925,766 | 12/1975 | Bardoffi et al. | 395/732 |
| 4,199,662 | 4/1980 | Lowe, Jr. | 370/85 |
| 4,273,005 | 6/1981 | Sullivan | 395/829 |
| 4,360,870 | 11/1982 | McVey | 395/829 |
| 4,546,450 | 10/1985 | Kanuma | 395/732 |
| 4,642,755 | 2/1987 | Hinch | 395/497 |
| 4,670,872 | 6/1987 | Cordill | 370/85 |
| 4,713,805 | 12/1987 | Henaff | 370/85 |
| 4,829,297 | 5/1989 | Ilg et al. | 340/825.08 |
| 4,855,997 | 8/1989 | Wilson et al. | 370/85 |
| 4,991,089 | 2/1991 | Shorter | 395/650 |
| 5,113,499 | 5/1992 | Ankney et al. | 395/726 |
| 5,130,983 | 7/1992 | Heffner, III | 370/85.8 |
| 5,250,942 | 10/1993 | Nakayama | 340/825.52 |
| 5,258,751 | 11/1993 | Deluca et al. | 340/825.44 |
| 5,278,984 | 1/1994 | Batchelor | 395/200.06 |
| 5,303,382 | 4/1994 | Buch et al. | 395/73.2 |
| 5,339,442 | 8/1994 | Lippincott | 395/732 |
| 5,361,388 | 11/1994 | Kutsuna | 395/829 |
| 5,426,427 | 6/1995 | Chinnock et al. | 395/200.12 |
| 5,440,558 | 8/1995 | Ban | 395/200.01 |
| 5,469,560 | 11/1995 | Beglin | 395/439 |
| 5,517,488 | 5/1996 | Miyazaki et al. | 370/16 |

*Primary Examiner*—Ayaz R. Sheikh
*Attorney, Agent, or Firm*—Warren & Perez

[57] ABSTRACT

An apparatus and method having a terminal address designation for each source, such as an end terminal. The terminal addresses have a predetermined priority assigned thereto for permitting programmed logic to categorize each terminal address into a stage for orderly sequential handling of data. The programmed logic is generally contained prior to a centralized computer and is able to manipulate a plurality of sources in a predetermined staging process. Once an assessment of priority has been determined by the system, a message is sent to each source to relay the order of priority or other similar message to permit a user to assess the timeliness of the system processing and schedule accordingly.

7 Claims, 5 Drawing Sheets

METHOD AND APPARATUS FOR A HOST COMPUTER TO STAGE A PLURALITY OF TERMINAL ADDRESSES

FIELD OF THE INVENTION

This invention generally relates to a method and apparatus for a host computer to stage a plurality of terminal addresses, and, in particular, a method and apparatus for permitting a centralized host computer to selectively access a plurality of terminals having a predetermined, prioritized terminal address associated therewith.

BACKGROUND OF THE INVENTION

In recent years, information handling has become a common task when dealing with a centralized computer networked to hundreds of terminals in remote locations. Despite the many advancements when dealing with large quantities of information being networked to numerous users, few systems have dealt with the enormous quantity of information that the airline industry deals with on a daily basis. Arguably, no other information handling system is more critical to the financial lifeline of developed countries; more vulnerable to peak periods during times of crises, such as war, natural disaster or labor strikes; or more inflexible when it comes to requiring the safe handling of critical flight information.

The largest such information handling system is owned by and operated by AMR Corporation. The host computer and the world-wide network is trademarked as Sabre Systems. The Sabre System comprises six (6) IBM model ESA 9000 mainframe computers and two (2) IBM model 300 which handle an astonishing 3920 messages per second. The communication network is linked to some 300,000 end users. As can be expected, not all 300,000 possible users desire or are entitled to the same priority when peak periods demand an assessment and implementation of prioritized use. Such, peak periods include times of strike, war, natural disaster and holidays. Unfortunately, systems are not designed to handle peak loads, but instead are designed to handle normal or regular capacity of information handling. Therefore, when peak periods arrive it is necessary to prioritize the users and handle the information in a manageable manner. This prioritization is necessary to insure that certain users that demand immediate access or service obtain such, while at the same time creating a system that is fair to other users which likewise need service.

In the past, the industry has recognized the need to have prioritized users. Unfortunately, the common method for prioritizing users was by line staging system which is performed at the front end of a host computer. Unfortunately, having the line staging being performed at the front end severely constrains any functional limitations. Front end staging can only stage an entire line not individual drops on a line. Therefore, if a line included one critical drop among several non-critical drops, the entire line was marked as critical. This system, therefore, did not permit a precise and efficient method for separating the critical from the non-critical users. In practice, well over half of the users were designated as critical and there was little attempt at distinguishing the degree of criticalness or a priority within groups considered critical users.

Therefore, a need has arisen for a host computer staging system which stages and determines the priority of each terminal by a terminal address. In addition, a need has arisen for a non-frontend processor staging system in order to have access and ability to determine priority with respect to each terminal rather than each line. In addition, a need has arisen for a system which is not shut down an entire office at one time, but instead permits each location to have some limited access to the centralized computer system. In addition, a need has arisen for an interactive system which can signal the user that the staging process is in place, having a planned duration of such staging, and which permits the lower prioritized user to plan their day accordingly. Furthermore, a need has arisen for a staging system which is controlled by the host computer rather than by a front-end processor or a network. Furthermore, a need has arisen to have a degree of predictability for each user by having a predetermined priority for each terminal by the designation of a prioritized terminal address. Finally, a need has arisen for a system which operates efficiently and cost-effectively in an industry which handles millions of transactions daily in an effective and expeditious manner.

SUMMARY OF THE INVENTION

The present invention relates to a method and apparatus for permitting a centralized host computer to selectively access a plurality of terminals having a predetermined prioritized terminal address associated therewith. In general, the apparatus comprises a terminal address assigned to each terminal wherein said terminal address has a predetermined prioritized access assigned to it. Once the terminal address has been assigned to a particular terminal, the handling of prioritization can be handled by the logic of the host computer. Once a terminal is engaged it will be networked to a front-end of a host computer. The front-end of the host computer permits the message to transfer to the host computer where logic will read and analyze the priority of the terminal address which is associated with the terminal. Once the logic has determined its priority the message from the terminal will either be permitted to continue within the host computer or will be put on stand-by. Once the priority has been determined by the logic of the host computer, a notice signal will be sent back through the front-end to the network and eventually to the terminal to permit the user to ascertain whether their message has been handled or whether they are required to wait.

In operation, every device attached to the network has an assigned staging category. Staging categories range from A through T for CRTs. Category U is assigned for printers and miniinterface devices. Category V is assigned for airport exempt locations, while category Z is assigned for exempt help type devices. The CRT at each subscriber location and reservation office is assigned the appropriate staging indicator based on a distribution method that is defined by CRTs at a location which will be staged from highest terminal address to lowest terminal address across all locations. By assigning a terminal address, the system is able to readily identify a priority as it related to each terminal address and handle the information in a sequential and orderly manner.

DETAILED DESCRIPTION OF THE INVENTION

Figure 1:
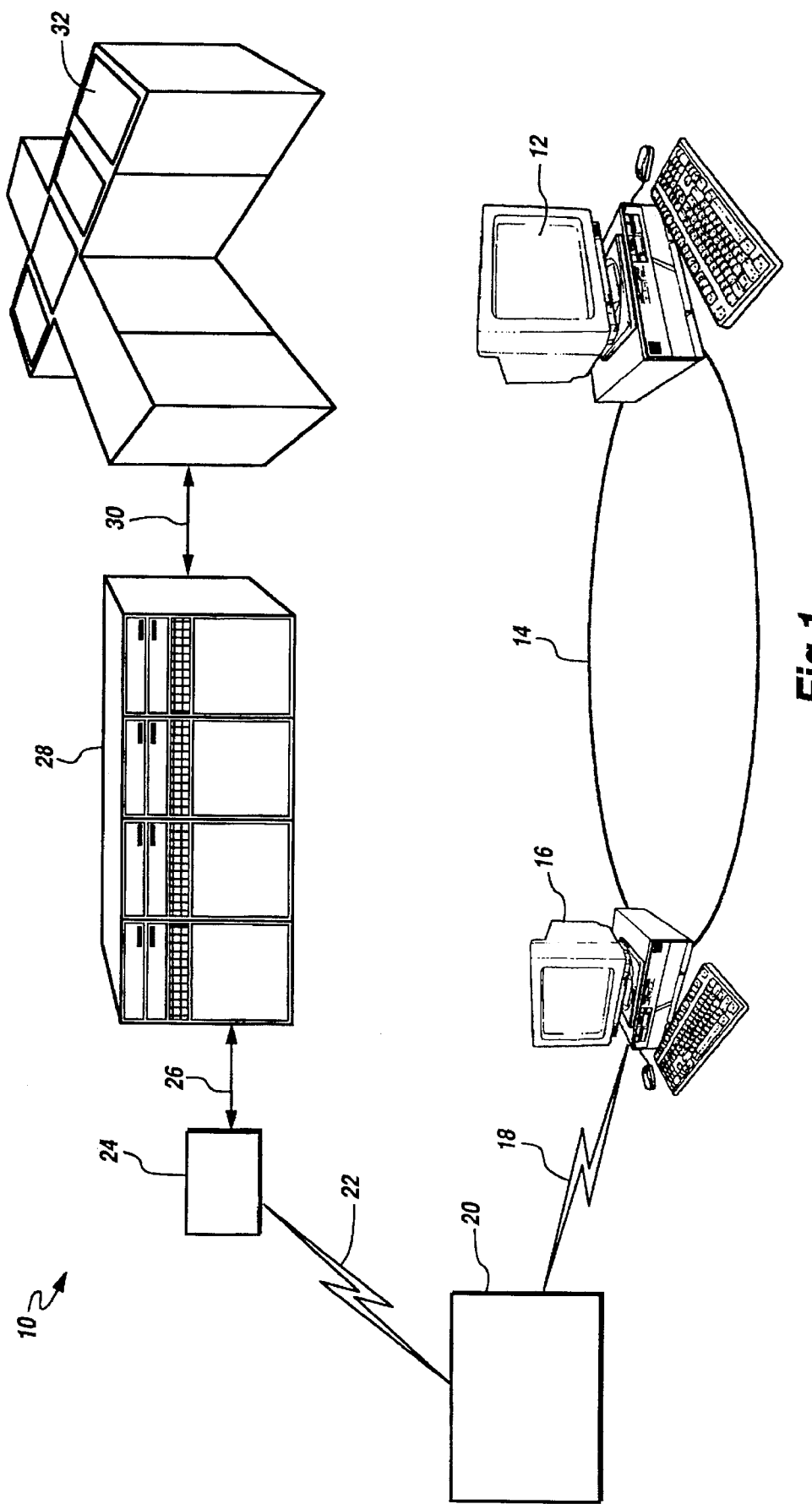
FIG. 1 illustrates a networked centralized computer of the prior art.

The present invention generally relates to a method and apparatus for permitting a centralized host computer to selectively access a plurality of terminals having a predetermined terminal address associated therewith. In operation the programmed logic contained at the host computer reads the terminal address associated with each terminal and prioritizes the terminal or user is able to access the host computer. In operation, a signal is sent to the user signifying a priority and an approximate for handling of data. The invention is particularly useful for handling systems which are networked and have peak use periods at critical times such as war, strike, natural disaster or vacation periods such as those frequently exhibited by the airline industry.

To more readily understand the terminology used in the particular industry and to more easily understand the subject matter of this invention, set forth below are terms and their corresponding definition.

Technical staging—Turning off diagnostics and other features which are used by central site personnel to monitor and control the system. Technical staging is transparent to customers, but may affect the ability of the Operations staff to operate the systems effectively and efficiently, or to identify and correct system problems.

Functional staging—Turning off applications or portions of applications so that customer functionality is restricted or inhibited.

Line staging—Deleting the ability of users on a line to access SABRE, so the inputs from these users do not reach the host or consume host resources. Normally, line staging is rotated. That is, some lines are staged for a specified period, usually thirty minutes. When that period expires, a new set of lines are staged and the first set of lines are restored to service.

Staging at the network—Normally line staging is performed by the front-end processors. Since the front-ends can only stage full lines and cannot stage portions of any networked lines, this feature is somewhat limited. During fare wars, lines can be turned off at the network where greater granularity is possible and where networked users can also be staged. Staging at the network allows the staging of more customers and thus makes it possible to spread the pain more generally around the customer community. Staging at the network, preferable at the source (ex: LAN Gateway) should be the ultimate goal of staging features.

LNIATA—Line Number, Interchange Address, Terminal Address. The specific set address of a terminal on the old SABRE network. At one time, the line number was a two digit number. As the SABRE network grew, two hexadecimal digits were no longer enough to accommodate the number of lines on the network. Since the IA or Interchange Address was always a single digit number, but two digits were available for it, it was possible to expand the Line Number to three digits by decreasing the IA to one digit. Front-end staging is designed around this three digit line number. This means that front-end staging is very limited, since each three digit line must contain all non-critical locations for the line to be marked as stagible. For example, to stage line 2B0 all the drops ("interchanges" on 2B0 (2B01 through 2B0F) must be stagible.

TA Mainframing Staging—A proposal to control staging by individual terminal address within the host mainframes. Terminals would be assigned to a specified staging group. When that group is being staged, entries coming from terminals in that group would be rejected at an early stage within TPF processing. Because these entries could be rejected quickly, the hosts could afford to handle many of them.

The host terminal address (TA) staging system is a unique feature controlled by real time coverage which rejects inputs from certain predetermined Iniatas during a staging period. Every CRT or LNIATA with access to the host computer is assigned a staging group designator lettered A through T. Printers, mini computers, and all CRTs at airports and certain exempted devices are assigned a staging group lettered U through Z. When staging is necessary real time coverage determines how many staging groups will need to be staged. Only groups A through T can be staged. Groups U through V are exempt from staging. In operation, the system functions as follows.

Referring now to FIG. 1, the prior art system for stating is generally designated 10. System 10 generally operates by having a work station 12 connected to a LAN 14. LAN 14 is consequently interconnected to a gateway 16 which operates as a direct connect to a communication system 18. It can be appreciated by one skilled in the art that communication system 18 can be one of several types of systems connected to a network 20. Network 20 can be a hard wire system or a microwave or radio wave system as can be appreciated by one skilled in the art. Network 20 is consequently interconnected to a communication system 22. Communication system 22 is connected to a Host computer system 32 which in prior art is initially a staging process 24 connected by way of connection 26 to a front-end processor 28. The front-end processor 28 is connected via connection communication 30 to Host Computer 32 for processing. Host Computer 32 processes the information initially inputted by the work-station 12.

Figure 2:
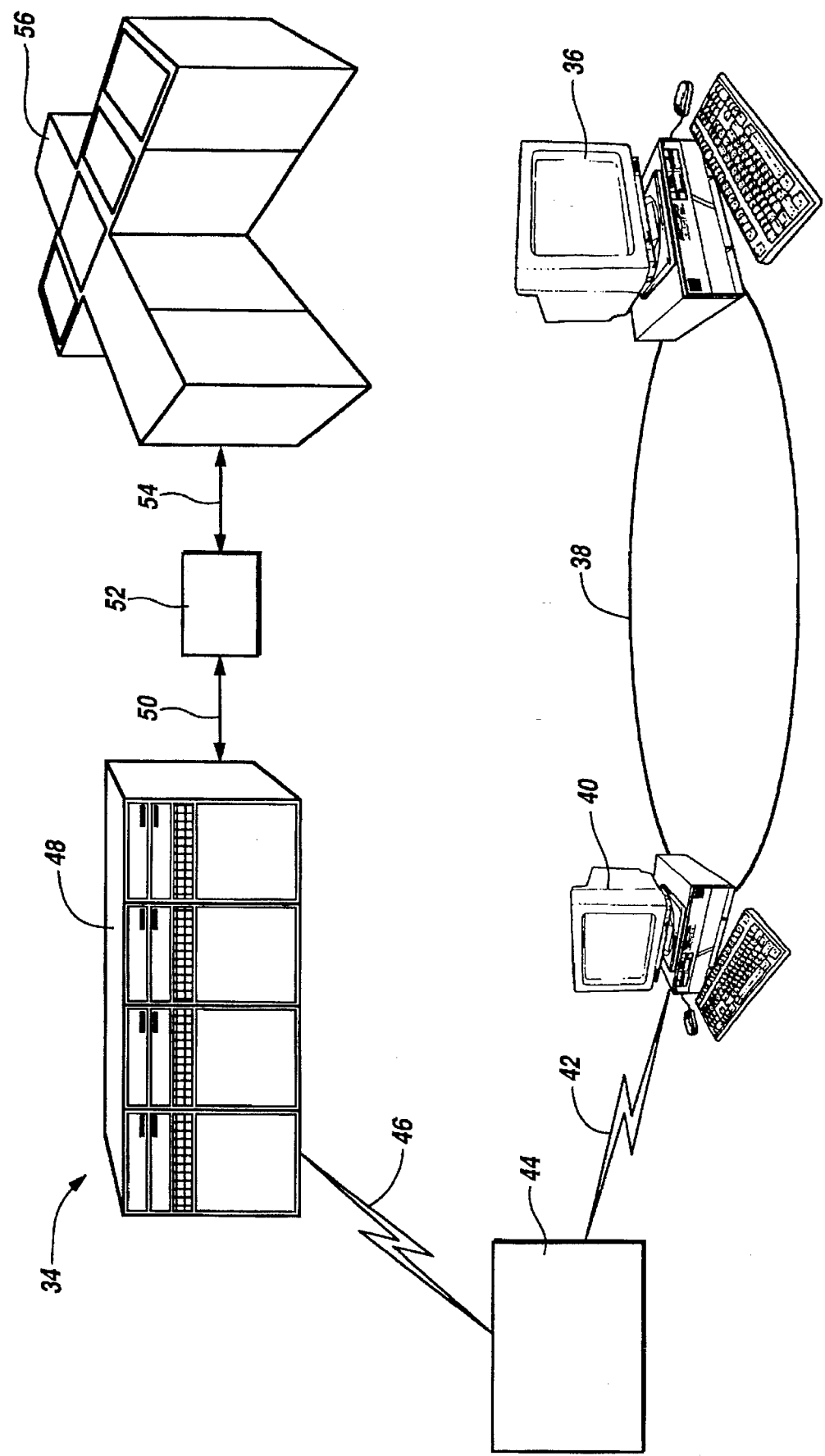
FIG. 2 illustrates a networked centralized computer of the present invention.

Now referring to FIG. 2, the present invention can be more readily understood. FIG. 2 shows a system 34 which interconnects similar to that shown in FIG. 1 with the unique exception which will be more readily understood after reviewing the entire disclosure. System 34 operates by having a work station 36 for inputting information by a user (not shown). Once the user has inputted information into work station 36, the information is sent via a LAN 38. LAN 38 is connected by one of several ways to a gateway 40. Gateway 40 operates as the point of communication between gateway 40 and a network 44 by way of communication link 42. As can be appreciated by one skilled in the art, in communication link 42 can be hard wire or wireless LAN systems which are under constant upgrade and development. Network 44 is connected by communication system 46 to a front-end processor 48. The front-end processor 48 is part of the Host system as can be appreciated by one skilled in the art. The Host system 48 is connected by way of connection 52 to a staging process 52. The staging processor 52 is consequently to the Host computer 56 by way of connection 54.

As can be appreciated in contrasting FIGS. 1 and 2, the location of the staging processor and the prior art was prior to the front-end processor 28 whereas the staging processor 52 is subsequent to the front-end processor 48 and immediately the Host Computer 56.

Figure 3:
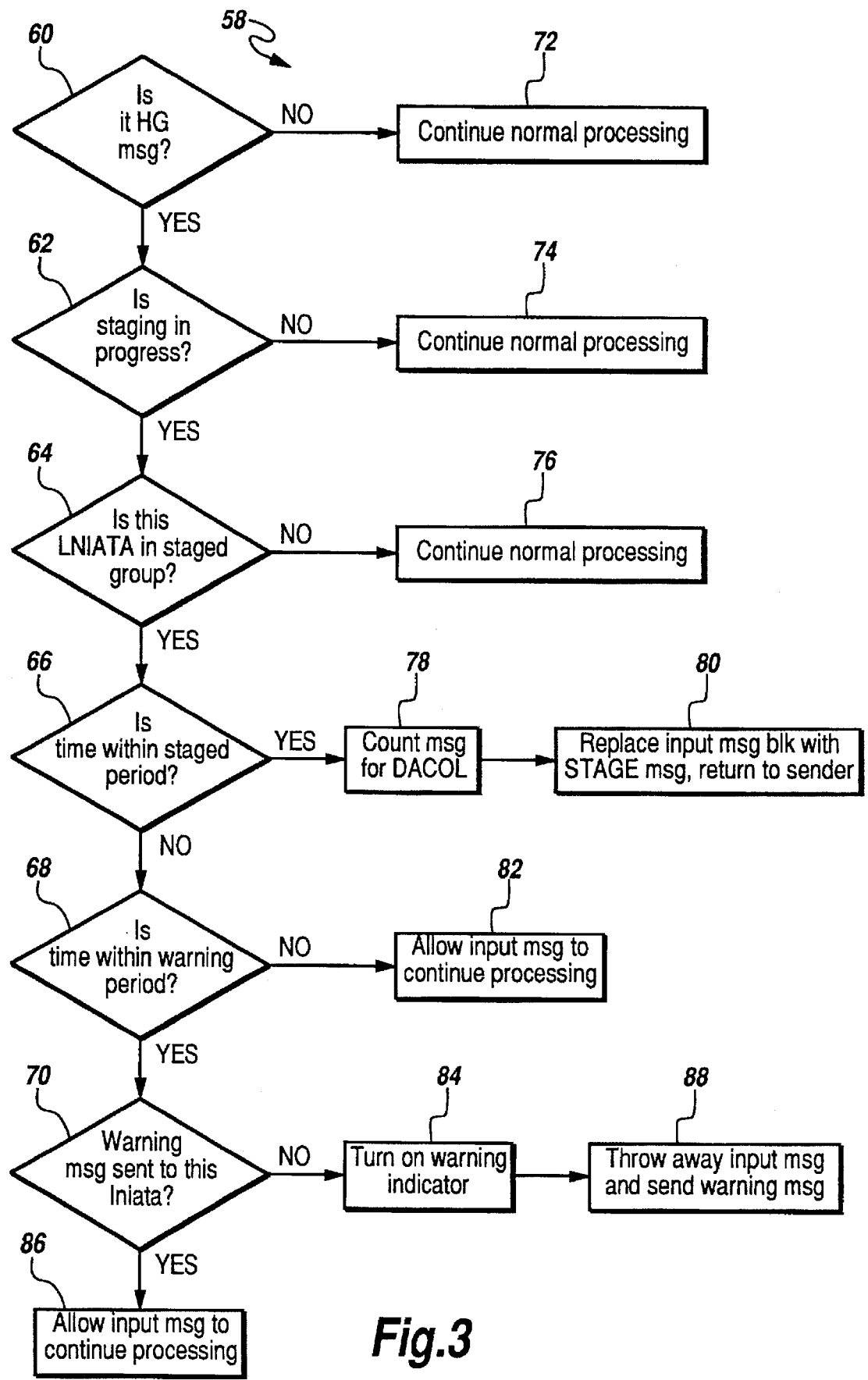
FIG. 3 illustrates a detailed logic diagram of the present invention.

Referring now to FIG. 3, a staging diagram 58 or the internal logic of a staging system 52 can be seen. In reference to FIG. 3, it can be seen that every device attached to the network is assigned a staging category. The staging categories range between A–T are defined for CRTs, category U for printers and many interface devices and category V for airport exempt locations and category Z for exempt help desk type devices. Each category, A through T, represents roughly five (5) percent of the stagable CRTs.

Referring to the logic diagram as set forth in FIG. 3, it can be seen that logic block 60 indicates that every message type that enters the host system is initially integrated. If it is not a high-speed message, then the message is allowed to follow its normal processing path to block 72. If, however, it is a high speed message, then it continues into the Host TA staging process to logic block 62.

In logic block 62, the program checks the Host TA staging indicators to determine whether staging is in process. If not, the high speed message is allowed to follow the normal processing block as represented by block 74. If the staging is in process, then the flow continues to what is represented as logic block 64.

In logic block 64, the program checks the inputting in LNIAA for a stage category within the currently staged groups. If it is outside the staging group, then processing is allowed to continue as normal to the block diagram represented as 74. If it is within the currently staged group, then the flow continues to logic block 66.

Logic block 66 checks the current time of its input message against the current staged times. If the time is within the staged times, then the message is counted for data collection purposes as represented by block 78. And subsequently the following response will be returned back to the inputting terminal:

hh.mm×RES STAGING IN EFFECT FOR SET ADDRESS lniata. SERVICE WILL RESUME AT hh.mm CST This message is represented by block diagram 80. If the current time is not within the staged time then processing continues as represented by logic diagram 68. In logic diagram 68, the program checks the current time against the warning time. If the time is not within the warning period, then the input message is allowed to continue normal processing as illustrated by block 82. If the time is within the warning time-frame, then processing continues to what is represented as logic block 70.

In logic block 70, the program checks an indicator in the lniata AAA to determine if a warning message has already been sent to its terminal. If so, then processing for this input message is allowed to continue as illustrated by block 86. If not, then the indicator is turned on then the AAA as illustrated by logic block 84. And the following warning message is returned to the inputting terminal which is illustrated as:

STAGING FOR THIS CRT WILL BE IN EFFECT FROM hh.mm TO hh.mm CST-COMPLETE CURRENT TRANSACTION.

This message is illustrated by block diagram 88.

Figure 4:
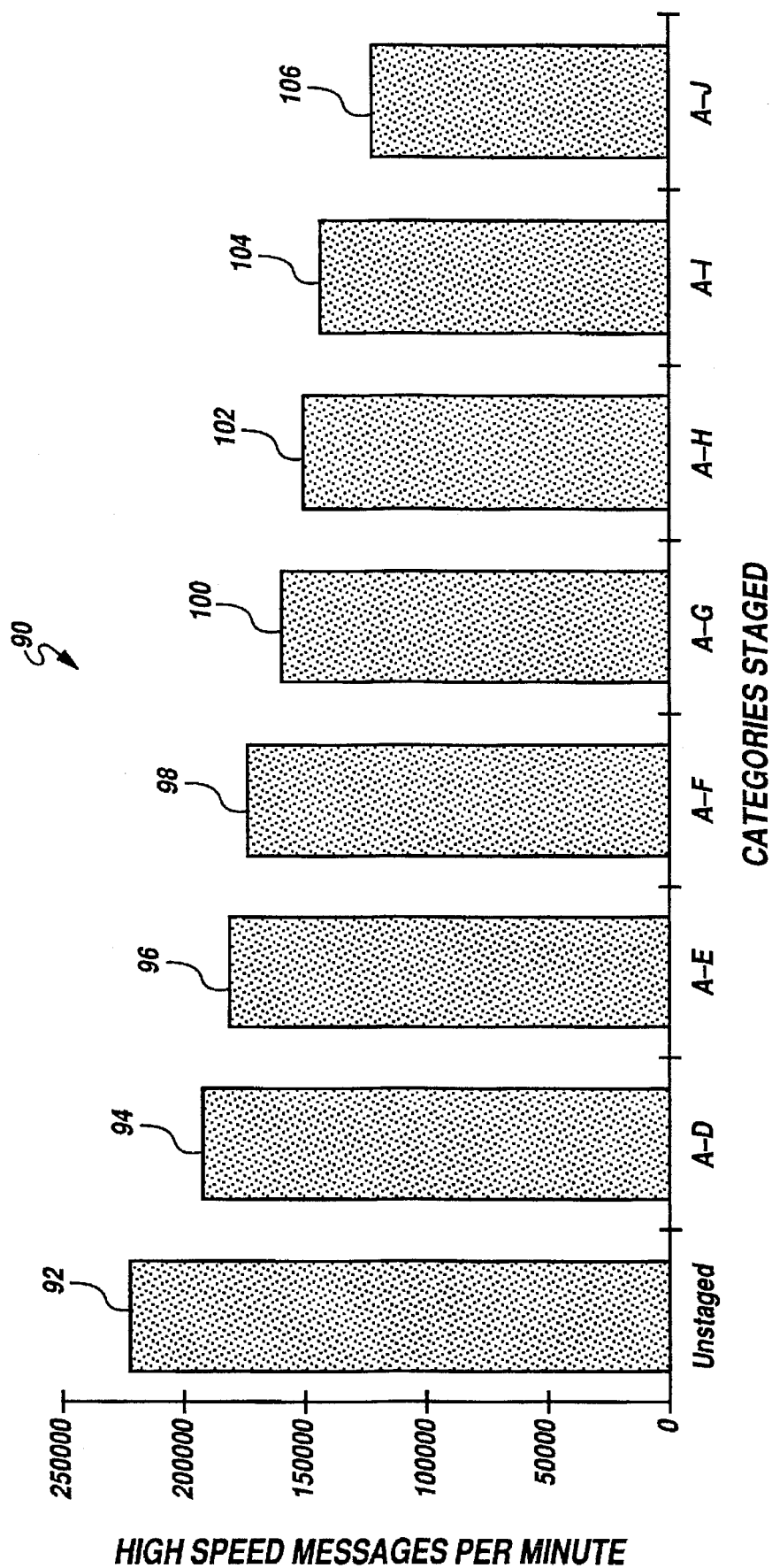
FIG. 4 illustrates the staging categories of the present invention.
Figure 5:
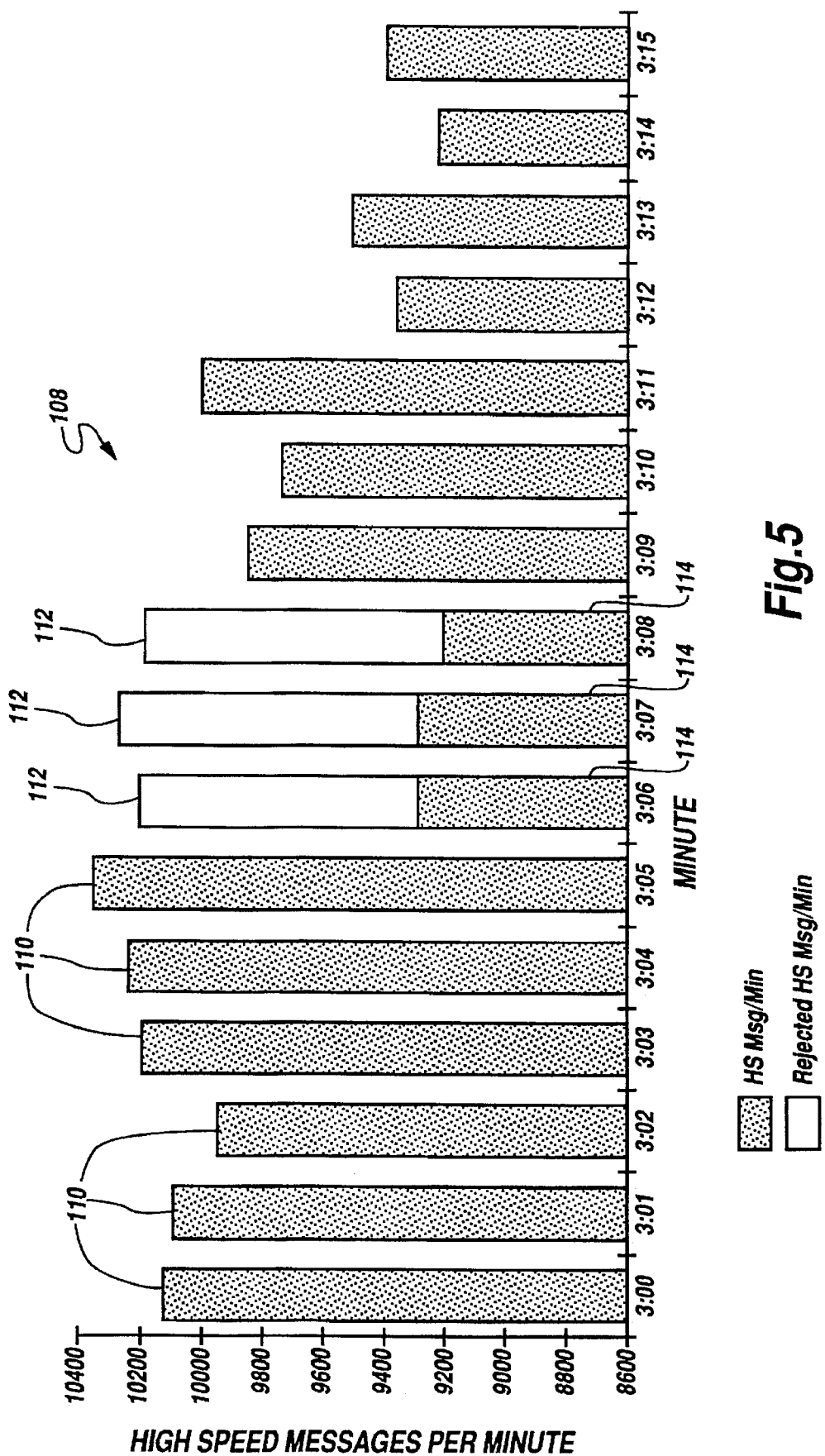
FIG. 5 illustrates a summary of a test of the invention.

Appreciating the internal logic of the staging system, the performance of the staging can be more readily appreciated by referring to FIG. 4 and FIG. 5. As illustrated in FIG. 4, the performance of the diagram 90 shows a plot of the high speed messages per minute against the categories staged. The initial unstaged category is shown as block 92 which in this diagram illustrates a high speed message per minute of 225,000 messages per minute. Block 94 shows category A–D category. A–D category represents a high speed message per minute approximately 190,000 messages per minute. Similarly, categories A–E as represented by block 94 represents a high speed message per minute of approximately 175,000 messages per minute. Category A–F, as represented by block 98, has a high speed message of 175,000 per minute. Category A–G, as represented by block 100, has a high speed of 165,000 messages per minute. Category A–H, as represented by block 102, has a high speed message of 145,000 messages per minute. Category A–I, as represented by block 104, has approximately a high speed message of 135,000 messages per minute. Finally, block 106 represents category A–J which has approximately 140,000 messages per minute. The speed of the various categories in the more readily appreciated in considering in contrast to that of an actual host-staging test which was conducted on Feb. 6, 1994 illustrating categories A–C. A–C as shown by diagram 108 shows the high speed messages per minute for a duration of fifteen minutes. The block 110 represent the high speed messages where as block 112 represents the rejected high speed messages in comparison to the remaining high speed messages at time 3 minutes 6 seconds, 3 minutes 7 seconds, 3 minutes 8 seconds.

EXAMPLE

Testing results from the Host TA Staging test dated Feb. 26, 1994 included the following information. The test was included in the regularly scheduled implementation of a control program that occurs on a quarterly basis. The test was initiated with the staging warning message at 0300 using the following entry: ZUKSG CAT-C, START-0305, END-0308. This initiated the staging warning message for five minutes beginning at 0300. All terminals with staging categories A–C received the staging warning message in response to an input message. At 0305 the terminals designated for staging in groups A–C began to see their messages as rejected due to staging with the appropriate message returned to their terminal.

At 0300 the system was handling successfully 10,120 messages per second. During the three minutes during the staging test, the system observed a message rejection rate of about 9.5%. For example, at 0306, the system was offered 10,274 messages. Of those, 978 messages were returned as rejected while 9,296 continued normally with their processing.

At the conclusion of the test, the message rate returned to normal within five minutes. This can be accounted for by the typical agent behavior to walk away when they realize the system will be temporarily unavailable.

Coverage assigns a staging interval for the groups. As an example, Coverage may assign staging from 9:00 AM to 5:30 PM for groups A through D. All devices in staging groups A, B, C and D would then be affected as follows: Within the five minutes preceding the beginning of the staging interval, each device that makes an entry will receive one warning message indicating this device will be staged. The warning message reads as follows:

hh.mm.ss II RES STAGING FOR SET ADDRESS lniata WILL BEGIN AT hh.mm CST. PLEASE FINISH CURRENT TRANSACTION This warning message is generated in lieu of the normal response to whatever entry was made, so the recipient of the warning will have to reenter his/her prior entry. Devices that are not used during the five minute warning period will not receive a warning message.

During the staging interval, each device that makes an entry will receive a rejecting response, indicating that staging is in progress and defining the time when staging will end. The rejecting message reads as follows:

hh.mm II RES STAGING IN EFFECT FOR SET ADDRESS lniata. SERVICE WILL RESUME AT hh.mm CST Devices that are NOT in staging groups A, B, C and D will not be affected in any way throughout the entire staging interval, in this example.

Devices are assigned to a staging group via a Commercial process that keys on COSMACC/MIDAS data. All the LNIATAs at each physical location (as defined by the LOCATION field in COSMASS/MIDAS) are treated as a staging unit.

The LNIATAs in each staging unit are reviewed to determine how many LNIATAs will need to be assigned to each staging group. As an example, a staging unit with 20 CRTs, 5 printers and a mini-computer will have one LNIATA in each staging group A through T, plus 6 LNIATAs in staging group U. The determination of which specific LNIATA goes in which specific staging group is accomplished via a "distribution model". For this project, six distribution models were proposed. Only one was used for the initial creation of the data base. Other distribution models may be provided in a later phase of the project, should customer needs dictate.

The initial distribution model assigns LNIATAs to groups A through T by sorting the CRT/IWS LNIATAs in order from highest TA (3C) to lowest (02). Thus, a location with 60 CRTs/IWSs distributed across 3 LNIAs would be sorted as follows:

LIN13C
LIN23C
LIN33C
LIN13A
LIN23A
LIN33A
LIN13B
LIN23B
LIN33B
LIN104
LIN204
LIN304
LIN102
LIN202
LIN302

The logic then determines how many LNIATAs will need to be assigned to each staging group to ensure an even distribution. In this example, 3 LNIATAs will need to be assigned to each group A through T. The distribution model then assigns the first 3 LNIATAs in the sorted listed to group A, the next 3 to group B and so forth, until all CRT/IWSs have been assigned. The exempt devices (printers, minicomputers) are assigned to staging group U during this same process. A rounding feature is provided to deal with locations where the quantity of LNIATAs does not divide into the 20 staging groups evenly. If a location has only one CRT/IWS, it is assigned staging group T to effectively eliminate the possibility that this location will lose all access to SABRE. A feature similar to rounding distributes devices to staging groups evenly when a location has more than one but less than 20 CRTs/IWSs.

staging unit. In the event of a staging condition, these customers will be affected by staging in exactly the same way as all other non-airport SABRE locations.

Some locations and functions have been specifically exempted from staging at the direction of senior management. All airport devices are exempt. This includes all CRTs/IWSs at all airports with access to PSS, whether operated by American Airlines, the American Eagle or the multihosted carriers. Additionally, certain critical functions are exempt, such as the direct links to credit cards, the control LNIATAs for Direct connect, the Help Desks and the technical operations centers.

The staging group for each CRT/IWS in the system is uploaded from the Commercial database to each PSS UAT via a newly developed premise staging application. Since configuration change activity in the system can invalidate the distribution of CRTs/IWSs in the staging groups, this process is activated daily to upload any changes detected in the Commercial database, thus ensuring PSS always contains accurate staging assignments. The staging group for each CRT/IWS is stored in that device's UAT and can be displayed for each individual LNIATA by entering:

OAMlniata lniata/UAT STATUS

AAA ASSIGNED

ORD/012345

CTYHDQ

STAGEG

A new entry has been provided to display the staging groups for an entire physical subscriber location. The entry is:

| PE*yyyy/STAGE | (yyyy = pseudo city code) |
|---|---|
| 761502 M STAGEU | 761502 MINI STAGEU |
| 761504 V STAGET | CRT |
| 761506 V STAGEO | |
| 761506 V STAGEJ | |
| 761508 V STAGEE | |
| 76150A V STAGEA | |
| 76150C P STAGEU | PTR |

Should a staging condition arise, SABRE users would be alerted via a sign-in message to display and review a staging schedule and staging procedures. Although a staging schedule entry has been provided, it is intended for technical use. The staging schedule will be copied into a STAR record containing the staging procedures so that SABRE users need reference only one source for staging information. The technical entry to display the staging schedule is:

| | | | ZUKSG DISP | | |
|---|---|---|---|---|---|
| LEVEL | CATGRY | WARNTIME | STARTTIME | ENDTIME | MSGS RETURNED |
| 3 | C | 08.55 | 09.00 | 17.30 | 0 |
| 3 | B | 08.55 | 09.00 | 17.30 | 0 |
| 3 | A | 08.55 | 09.00 | 17.30 | 0 |

It is important to note that virtual CRTs/IWSs are staged, just as actual CRTs/IWSs are. That means that features using a pool of AAA's to provide CRT/IWS virtuality are also affected by staging. For example, customer groups like Prodigy, EAASY and SABRE have a staging group assigned to each LNIATA in their pools of AAA's. Normally, the pooled AAA's for each customer group have the same location in the location field in COSMACC/MIDAS and thus the entire pool for each customer group is treated as one Every device attached to the SABRE network has been assigned a staging category. Staging categories A–T are defined for CRTs, category U for printers and mini interface devices, category V for airport exempt locations and category Z for exempt help desk type devices. Various entries have been provided for identifying staging categories.

Each category, A–T represents a percentage of the stagable SABRE CRTs.

Each CRT at a subscriber location is assigned the appropriate staging indicator based on a distribution method that is defined as follows: CRT's at a location will be staged from highest TA to lowest TA across all LNIA's at the location, with a location being defined as a pseudo city.

Once it has been determined that staging is necessary, the % of relief will dictate the staging level.

| Level 1 | ⁻5% | Stage group A |
|---|---|---|
| Level 2 | ⁻10% | Stage groups A,B |
| Level 3 | ⁻15% | Stage groups A,B,C |
| Level 4 | ⁻20% | Stage groups A,B,C,D |
| Level 20 | ⁻100% | Stage groups A,B,C,D . . . T |

Five minutes prior to a CRT being staged, a warning message will be sent to each CRT to be staged advising the customer that staging will begin at a specified time, and to complete their current transaction.

The response will appear as follows:

hh.mm×RES STAGING FOR SET ADDRESS Iniata WILL BEGIN AT xx.xx CST.

PLEASE FINISH CURRENT TRANSACTION.

hh.mm is the current time x is the staging level

Iniata is the lniata of the inputting terminal xx.xx is the time staging for the terminal will begin Once staging has been initiated, a customer being staged that makes an input message will receive the following response back to their terminal:

hh.mm×RES STAGING IN EFFECT FOR SET ADDRESS lniata. SERVICES WILL RESUME AT xx.xx CST.

In addition to the actual staging response, the SABRE sign-in message will direct the customer to view a universal star to obtain further staging information. For AA, Multi-host, and Eagle location, N*/STAGING INFO will be viewed. For subscribers, Y/SCS/CRS will direct customers to view N*/STAGING ADVICE. These stars will contain detailed explanations of the staging process, as well as the staging schedule for the day.

Since the staging categories are assigned using a mathematical formula that considers the total number of terminals for a site, any time the device make-up at that site changes, i.e. equipment changes, terminals deleted, terminals added, the model will be re-run for that site and the distribution may change. A customer should be advised during equipment changes that they should review their staging categories about a week after changes are complete to view any staging category differences.

Some entries are available for all customers, while others are subscriber or AA, Multi-host and Eagle unique. Each will be identified as to the appropriate customer base that can access that information.

1. (space) cross of lorraine J entry will display your Iniata's staging indicator. This is available for all customers. Note the space preceding the cross of lorraine. This response comes from SABRE, not the front-end. YOUR SET ADDRESS IS F70E02 STG-Z 2. OAM entries have been provided to identify a lniata's staging indicator.

These entries are available to AA, Multi-host and Eagle customers only.

```
OAM
F70E02/UAT STATUS
AAA ASSIGNED
ORD/254126
CTYFSG
STAGEZ
M02359
T00000              Example of FSG exempt Iniata
USR-AA
CRT-19
CRTSST
MULUSR
NOTDCF
OAM
F70E02/UAT STATUS
AAA ASSIGNED
ORD/254126
CTYFSG
M02359
STAGE*
T00000              Example of unassigned Iniata
USR-AA
CRT-19
CRTSST
MULUSR
NOTDCF
OAM17E402
17E402/UAT STATUS
AAA ASSIGNED
ORD/153845
CTY***
STAGET
M00000              Example of subscriber CRT
T01655/G3R0
USR-AA
CRT-19
CRTSST
OAM17E43A
17E43A/UAT STATUS
AAA ASSIGNED
ORD/132575
CTY***
STAGEU
M00000
T01655/G3R0         Example of printer device
USR-AA
ICOTPR
TERMNT
PRODEV
BLKCOM
OAM17E43C
17E43C/UAT STATUS
AAA ASSIGNED
ORD/099254
CTY***
STAGEU
M00000
T01655/G3R0         Example of mini interface device
USR-AA
MINCOM
```

3) OAM display for entire LNIA.

```
OAM 17E4
TA STTUS AAAORD USR CTY****OTHER UAT ATTRIBUTES ****
02 ACTIVE 153845 AA G3R0 STAGET T01655 CRT-19 CRTSST
04 ACTIVE 153846 AA G3R0 STAGES T01655 CRT-19 CRTSST
06 ACTIVE 153847 AA G3R0 STAGER T01655 CRT-19 CRTSST
08 ACTIVE 153848 AA 63R0 STAGER T01655 CRT-19 CRTSST
0A ACTIVE 153849 AA G3R0 STAGEQ T01655 CRT-19 CRTSST
0C ACTIVE 153850 AA G3R0 STAGEQ T01655 CRT-19 CRTSST
0E ACTIVE 153851 AA G3R0 STAGEP T01655 CRT-19 CRTSST
10 ACTIVE 153852 AA G3R0 STAGEP T01655 CRT-11 CRTSST
         CRTHLF ----- ----- -----
12 ACTIVE 153853 AA 63R0 STAGEO T01655 CRT-19 CRTSST
14 ACTIVE 153854 AA G3R0 STAGEN T01655 CRT-19 CRTSST
16 ACTIVE 153855 AA G3R0 STAGEN T01655 CRT-19 CRTSST
18 ACTIVE 153856 AA 63R0 STAGEM T01655 CRT-19 CRTSST
1A ACTIVE 153857 AA G3R0 STAGEL T01655 CRT-11 CRTSST
         CRTHLF ----- ----- -----
1C ACTIVE 153858 AA G3R0 STAGEK T01655 CRT-11 CRTSST
         CRTHLF ----- ----- -----
1E ACTIVE 153859 AA G3R0 STAGEJ T01655 CRT-19 CRTSST
20 ACTIVE 153860 AA 63R0 STAGEI T01655 CRT-19 CRTSST
22 ACTIVE 153861 AA G3R0 STAGEH T01655 CRT-19 CRTSST
24 ACTIVE 153862 AA G3R0 STAGEH T01655 CRT-11 CRTSST
         CRTHLF ----- ----- -----
26 ACTIVE 153863 AA G3R0 STAGEG T01655 CRT-19 CRTSST
28 ACTIVE 153864 AA G3R0 STAGEF T01655 CRT-11 CRTSST
         CRTHLF ----- ----- -----
2A ACTIVE 153865 AA G3R0 STAGEE T01655 CRT-19 CRTSST
2C ACTIVE 153866 AA G3R0 STAGEE T01655 CRT-11 CRTSST
         CRTHLF ----- ----- -----
2E ACTIVE 153867 AA G3R0 STAGED T01655 CRT-11 CRTSST
         CRTHLF ----- ----- -----
30 ACTIVE 153968 AA G3R0 STAGEC T01655 CRT-19 CRTSST
32 ACTIVE 153869 AA 63R0 STAGEC T01655 CRT-19 CRTSST
34 ACTIVE 153870 AA G3R0 STAGEB T01655 CRT-19 CRTSST
36 ACTIVE 153871 AA BY80 STAGEB T09868 CRT-11 CRTSST
         CRTHLF ----- ----- -----
38 ACTIVE 153872 AA BY80 STAGEU T09868 MINICOM -----
3A ACTIVE 132575 AA G3R0 STAGEU T01655 ICOTPR TERMNT
         PRODEV BLKCOM ----- -----
3C ACTIVE 099254 AA G3R0 STAGEU T01655 MINICOM -----
```

4) A subscriber may use the following entry to display its entire office. (Notice the distribution, the lowest TA's have the highest staging category)

```
     ZUKSG DISP
     CSMP97I 14.44.00 CPU-A SS-BSS SSU-AA IS-01
     YKGB10I 14.44.00
LEVEL    CATGRY    WARNTIME    STARTTIME    ENDTIME    MSGS RETURNED
1        A         15.55       16.00        16.0       0
     YDGA06I 14.44.00 OK
```

Staging at level 4:

```
     ZUKSG DISP
     CSMP97I 14.44.47 CPU-A SS-BSS SSU-AA IS-01
     YKGB10I 14.44.47
LEVEL    CATGRY    WARNTIME    STARTTIME    ENDTIME    MSGS RETURNED
4        D         15.55       16.00        16.01      0
4        C         15.55       16.00        16.01      0
4        B         15.55       16.00        16.01      0
4        A         15.55       16.00        16.01      0
     YKGA06I 14.44.47 OK
```

```
PE*G3R0/STAGE
17E102 M STAGEU
17E104 V STAGES
17E106 P STAGEU
17E108 P STAGEU
17E10A P STAGEU
17E10C V STAGEP
17E10E V STAGEP
17E110 V STAGEP
17E112 V STAGEO
17E114 V STAGEN
17E116 V STAGEM
17E118 V STAGEM
17E11A V STAGEL
17E11C V STAGEK
17E11E V STAGEJ
17E120 V STAGEI
17E122 V STAGEH
17E124 V STAGEG
etc.
```

5) Special system-type functional entries are provided to monitor the actual staging process. These entries will be used by Realtime Coverage to control the warning, start, and stop times, as well as the staging level. They will also provide some statistical information. The entry is not available in PSS to FSGAGT users as of Dec. 21, but should be available by the end of the month.

Staging not in progress:

```
ZUKSG DISP
CSMP97I 14.38.13 CPU-A SS-BSS SSU-AA IS-01
YKGB11I 14.38.13 NOTHING STAGED NOW
CSMP97I 14.38.13 CPU-A SS-BSS SSU-AA IS-01
YKGA06I 14.38.13 OK
```

Staging at level 1

OPERATIONS

An example of a computer program which operates the described invention is as follows:

```
OPEN FILE(IINT0621),
     FILE(IINT0622),
     FILE(IINT0623),
     FILE(IINT0621),
     FILE(IINT0622),
     FILE(IINT0623);
DEVICE_TABLE (*) = '';
EXEMPT_TABLE (*) = '';
LOCATION_TABLE (*) = '';
CALL LOAD_EXEMPT_TABLE;
CALL LOAD_LOCATION_TABLE;
READ FILE(IINT0621) INTO(DEV_IN):
LOCATION_HOLD = DEV_IN.COSMACC_LOCATION
DO WHILE(-EOFDEV):
     CALL INIT_LOAD_DEVICE_TABLE;
     IF NUMB_OF_CRTS_FOR_LOCN <1 THEN
          GO TO BYPASS;
     NUMB_OF_CRTS_STAGED_FOR_LOCN = 0;
     DO STAGING_LEVEL = 5 TO 100 BY 5;
          NUMB_OF_CRTS_STAGED_THIS LEVEL = ROUND
               ((STAGING_LEVEL *.01 * NUMB_OF_CRTS_FOR_LOCN) -
               (NUMB_OF_CRTS_STAGED_FOR_LOCN + .5), 0);
          DO I = (NUMB_OF_CRTS_STAGED_FOR_LOCN + 1)
                    TO (NUMB_OF_CRTS_STAGED_FOR_LOCN +
                    NUMB_OF_CRTS_STAGED_THIS_LEVEL);
          DEVOUT = DEVICE TABLE(1);
          SELECT (SUBSTR(DEV_OUT.COSMACC_LOCATION, 7, 1));
               WHEN('A')      R_IDX=1;
               WHEN('C')      R_IDX=2;
               WHEN('H')      R_IDX=3;
               WHEN('M','P')  R_IDX=4;
               WHEN('S')      R_IDX=5;
               WHEN('T')      R_IDX=6;
               WHEN('W')      R_IDX=7;
               OTHERWISE      R_IDX=8;
          END:
          IF RESET_ALL_TA = 'Y' THEN
               DEV_OUT.STAGING_OVERRIDE='1';
SELECT (DEV_OUT.STAGING_OVERRIDE);
     WHEN('1')
     DO:
          TOTAL_VALUE1=TOTAL_VALUE1 + 1;
          CALL CHECK_AIRPORT_MULTI_EXEMPTIONS;
          CALL CEHCK_HARDCODE_UAT_EXEMPTIONS;
          CALL CHECK_LOCATION_EXEMPTIONS;
     /*DEV_OUT.STAGING_OVERRIDE = '2';*/
          /*THE OVERRIDE WILL REAMIN A '1' */
          /*BUT WILL BE SET TO A '2' IN THE*/
          /*COMPARE PROCESS. THIS CLOSES */
          /*THE RESET HOLE FOUND IN TESTING*/
     END:
     WHEN('2')
     DO:
          TOTAL_VALUE2 = TOTAL_VALUE2 + 1;
          CALL CHECK_AIRPORT_MULTI_EXEMPTIONS;
          CALL CHECK_HARDCOE_UAT_EXEMPTIONS;
          CALL CHECK_LOCATION_EXEMPTIONS;
     END;
     WHEN('3')'
     DO:
          TOTAL_VALUE3 = TOTAL_VALUE3 +1
          BIN_RETURN = 0;
          AIR_MULTI_EXEMPT - 'N';
          LOCATION_EXEMPT - 'N';
          DEV_OUT.STAGING_IND = DEV_OUT.OLD_STAGING_IND;
          CALL ADDTO_STAGING_CATEGORY;
     END:
     WHEN('4')
     DO:
          TOTAL_VALUE4 = TOTAL_VALUE4 + 1
          BIN_RETURN = 0
          AIR_MULTI_EXEMPT = 'N';
          LOCATION_EXEMPT - 'N';
          DEV_OUT.STAGING_IND = DEV_OUT.OLD_STAGING_IND;
          CALL ADDTO_STAGING_CATEGORY;
     END;
END;
IF AIR_MULTI_EXEMPT = 'Y'
     BIN_RETURN > 0
     LOCATION_EXEMPT - 'Y'
```

```
            DEV_OUT.STAGING_OVERRIDE = '3'
            DEV_OUT.STAGING_OVERRIDE = '4' THEN
            DO:
                    IF AIR_MULTI_EXEMPT = 'Y' THEN
                    DO:
                            DEV_OUT.STAGING_IND = 'V';
                            TOTAL_STAGEV(R_IDX)=TOTAL_STAGEV(R_IDX) +1
                            END:
                    ELSE
                            IF BIN_RETURN >0
                            LOCATION_EXEMPT = 'Y' THEN
                    DO:
                    DEV_OUT.STAGING_IND = 'Z';
                    TOTAL_STAGEZ(R-IDX)=TOTAL_STAGEZ(R-IDX) +1
                    END:
            SELECT (DEV_OUT.STAGING_IND);
                    WHEN('U','V','W','X','Y','X')
                    TOTAL_CRT_STGD = TOTAL_CRT_STGD -1
                    OTHERWISE;
                    END:
            END:
            ELSE
                    CALL SELECT_STAGING_IND;
            WRITE FILE(OINT0621) FROM(DEV_OUT);
            TOTAL_DEVOUT - TOTAL_DEVOUT +1
            END; /* DO i */
NUMB_OF_CRTS_STAGED_FOR_LOCN_NUMB_OF_CRTS_STAGED
_FOR_LOCN+NUMB_OF_CRTS_STAGED_THIS_LEVEL;
END: /*DO STAGIN LEVEL */
BYPASS:
END: /*DO WIHLE -EOFDEV */
```

An example of a computer program for accounting for the exempt categories is as follows:

```
OPEN FILE(INT0611),
     FILE(INT0612),
     FILE(INTO611);
CALL LOAD_HRDCOD_TABLE;
READ FILE(INT0611) INTO(UA1_IN);
DO WHILE(-EOFUAT);
        IF UA1BID - 'UA' THEN
        DO:
                TOTAL_UATIN = TOTAL_UATIN +1
                DO I = 1 TO 21;
                BIT_CHECK - ANY(UA1ADD);
                IF BIT_CHECK > '0000'B &
                UA1TTP(I) <= '7F'X THEN
                DO;
                        EXEMPT-OUT - '';
                        DO J = 1 TO 6;
                        SELECT (UA1ADD(I,J));
                                WHEN ('0000'B)      LNIATA(J) = '0';
                                WHEN ('0001'B)      LNIATA(J) = '1';
                                WHEN ('0010'B)      LNIATA(J) = '2';
                                WHEN ('0011'B)      LNIATA(J) = '3';
                                WHEN ('0100'B)      LNIATA(J) = '4';
                                WHEN ('0101'B)      LNIATA(J) = '5';
                                WHEN ('0110'B)      LNIATA(J) = '6';
                                WHEN ('0111'B)      LNIATA(J) = '7';
                                WHEN ('1000'B)      LNIATA(J) = '8';
                                WHEN ('1001'B)      LNIATA(J) = '9';
                                WHEN ('1010'B)      LNIATA(J) = 'A';
                                WHEN ('1011'B)      LNIATA(J) = 'B';
                                WHEN ('1100'B)      LNIATA(J) = 'C';
                                WHEN ('1101'B)      LNIATA(J) = 'D';
                                WHEN ('1110'B)      LNIATA(J) = 'E';
                                WHEN ('1111'B)      LNIATA(J) = 'F';
                        END;
                        END;
                        SWITCH = '0'B;
                        CALL CHECK_HRDCOD-TABLE;
                        IF BIN_RETURN >0 THEN
                        DO;
                                HRDCODE = 'HRDCOD';
```

```
                              THRDCOD = THRDCOD +1
                              SWITCH = '1'B;
                      END;
           DO:
                      CPUSET = 'CPUSET';
                      TFPUSET = TCPUSET +1;
                      SWITCH = '1'B;
           END;
/* ICOST250-255 */
IF UA1CIT(I)= '000BB9'X THEN
           DO:
                      E_NUMBER = 'E03001';
                      TE03001 = TE03001 +1;
                      SWITCH = '1'B;
           END:
/* REVHOST EXEMPT "AA" PARTITION ONLY */
IF UA1UID(I) = '00'X THEN
           SELECT (UA1CIT(I)00;
                      WHEN ('000064'x)
                              DO:
                                  E_NUMBER = 'E00100';
                                  TE00100 = TE00100 +1
                                  SWITCH = '1'B;
                              END;
                      WHEN ('000065'X)
                              DO:
                                  E_NUMBER = 'E00101';
                                  TE00101 = TE00101 +1;
                                  SWITCH = '1'B;
                              END;
                      WHEN ('000066'X)
                              DO:
                                  E_NUMBER = 'E00102';
                                  TE00102 = TE00102 +1;
                                  SWITCH '1'B;
                              END;
                      WHEN (1000067'X)
                              DO:
                                  E_NUMBER = 'E00103';
                                  TE00103 = TE00103 +1
                                  SWITCH = '1'B;
                              END;
                      WHEN ('000096'X)
                              DO:
                                  E_NUMBER = 'E00150':
                                  TE00150 = TE00150 +1
                                  SWITCH = '1'B;
                              END;
                      WHEN ('0000B5'X)
                              DO:
                                  E_NUMBER = 'E00181';
                                  TE00181 = TE00181 +1;
                                  SWITCH '1'B;
                              END;
                      WHEN ('0000C8'X)
                              DO:
                                  E_NUMBER = 'E00000';
                                  TE00200 = TE0020 +1;
                                  SWITCH = '1'B;
                              END;
                      WHEN ('0000D3'X)
                              DO:
                                  E_NUMBER = 'E00211';
                                  TE00211 = TE00211 +1;
                                  SWITCH = '1'B;
                              END;
                      WHEN ('0000D7'X)
                              DO:
                                  E_NUMBER = 'E00215';
                                  TE00215 = TE00215 +1
                                  SWITCH = SWITCH '1'B;
                              END;
                      WHEN ('0000DC'X)
                              DO:
                                  E_NUMBER = 'E00220';
                                  TE00220 = TE00220 +1;
                                  SWITCH = SWITCH '1'B;
                              END;
                      WHEN ('0000FA'X)
                              DO:
```

```
                    E_NUMBER 'E00250';
                    TE00250 = TE00250 +1;
                    SWITCH SWITCH = '1'B;
                    END;
                WHEN ('000122'X)
                    DO:
                    E_NUMBER = 'E00290';
                    TE00290 = TE00290 +1;
                    SWITCH = SWITCH '1'B;
                    END;
                WHEN ('00020D'X)
                    DO:
                    E_NUMBER = 'E00525';
                    TE00525 TE00525 +1;
                    SWITCH = SWITCH 'I'B;
                    END;
                WHEN ('00020E'X)
                    DO:
                    E_NUMBER = 'E00526';
                    TE00526 = TE00526 +1;
                    SWITCH - '1'B;
                    END;
                WHEN ('00020F'X)
                    DO:
                    E-NUMBER = 'E00527';
                    TE00527 = TE00527 +1;
                    SWITCH = SWITCH 'I'B;
                    END:
        /* REMOVED 11/10/92 TO CLOSE HARDCODE LOOP
                IF UA1STG(I) = 'Z' THEN
                    DO:
                    OVRIDE = 'OVRIDE';
                    TOVRIDE = TOVRIDE +1;
                    SWITCH - '1'B;
                    END:
        /*
                IF SWITCH THEN
                    DO:
                        WRITE FILE_OINT0611) FROM(EXEMPT_OUT);
                        TOTAL_EXEMPT = TOTAL_EXEMPT +1
                    END;
            END:
    END; /* 1 TO 32 */
END; /* UA */
```

The system generally operates as follow:

1) The SABRE sine-in message will be updated and will refer you to STARS which outline the SABRE Pledge process and schedules.

2) Five minutes prior to restricting SABRE access, an alert message will be sent to each workstation affected. Here is an example of the message that will appear on your screen:

12.55 1 STAGING FOR THIS CRT WILL BE IN EFFECT FROM 13.00 TO 17:00 CST— COMPLETE CURRENT TRANSACTION

3) Any SABRE entries attempted after a workstation has had SABRE access inhibited will receive the following response:

13.05 1 RES STAGING IN EFFECT FOR SET ADDRESS 34C50C SERVICE WILL RESUME AT 17.00 CST

DETERMINING THE SABRE PLEDGE PLAN

1) You may review the SABRE Pledge category assigned to each piece of equipment for your entire office or a SABRE authorized branch by making the following entry:

| ENTRY: PE*PCC/STAGE | | EXAMPLE: PE*B4TO/STAGE |
|---|---|---|
| | LNIATA | TYPE | CATEGORY |
| RESPONSE: | 17E102 | MINI | STAGEU |
| | 17E104 | CRT | STAGES |
| | 17E106 | PTR | STAGEU |
| | 17E108 | PTR | STAGEU |
| | 17E10C | CRT | STAGEP |
| | 17E10E | CRT | STAGEG |

The first column shows the line address followed by the type of equipment. "MINI" is for Mini Interface, "CRT" indicates workstation, and "PTR" indicated a printer. The last column indicates the staging category for each device.

NOTE: All SABRE hardware is assigned a category indicator. Stage categories A through T are defined for workstations. Category U is defined for printers and mini interface equipment. Printers and mini interface will not be taken out of service.

2) As information, following is an approximation of the percentage of SABRE Pledge workstations that will be affected in each category:

| CATEGORY | PERCENT OF WORKSTATIONS INHIBITED SYSTEM WIDE |
| --- | --- |
| A–C | 10% |
| D–E | 20% |
| F–G | 30% |
| H–I | 40% |
| J | 50% |
| K–M | 60% |
| N–O | 73% |
| P–R | 80% |
| S | 83% |
| T | 100% |

3) You may also determine at the individual workstation which stage category applies to that equipment by making the following entry:

| | | |
| --- | --- | --- |
| ENTRY: | space#J | (The space is required) |
| RESPONSE: | YOUR SET ADDRESS IS 34C50C STG-P | |

NOTE: This response indicates that the device is in SABRE Pledge category P.

4) In the event that SABRE Pledge becomes effective, you will be directed to display the SABRE Pledge Schedule STAR. (N*/SABRE PLEDGE SCHEDULE) An example of how the schedule will appear follows:

| SABRE PLEDGE SCHEDULE EFFECTIVE /MONTH.DAY.YEAR/ | | | |
| --- | --- | --- | --- |
| CATEGORY | WARNING TIME | BEGIN TIME | END TIME |
| A | 0855 CST | 0900 CST | 1600 CST |
| B | 0855 CST | 0900 CST | 1600 CST |
| C | 0855 CST | 0900 CST | 1600 CST |
| D | 0800 CST | 0900 CST | 1600 CST |

5) By matching the schedule published in the SABRE STAR N*/SABRE PLEDGE SCHEDULE with the category you determined for your equipment in Step 1, exact times for SABRE restricted access may be established.

The terms and expressions herein employed are used as terms of description and not of limitation, and there is no intent in the use thereof to exclude equivalents, but on the contrary it is intended to include any and all equivalents, adaptations and modifications that can be employed without departing from the spirit and scope of the invention as described in the specification and claims herein.

What is claimed is:

1. A system for prioritizing electronic messages from a plurality of terminals to a centralized host computer, said terminals having a terminal addresses indicating predetermined priority levels, said system comprising:

means for reading said terminal address from each said terminal, said means communicably coupled to said terminals;

means for staging said plurality of terminal addresses coupled to the centralized host computers, said staging means prioritizing the terminal address in a sequential priority;

means for sending the electronic messages to the centralized host computer in said sequential priority for processing of said electronic messages; and means for notifying each said terminal of the sequential priority of its respective address terminal.

2. The system as recited in claim 1, wherein said terminal addresses are designated by categories A-D, A-E, A-F, A-G, A-H, A-I and A-J.

3. The system as recited in claim 1 wherein said means for reading comprises a computer.

4. The system as recited in claim 1, wherein said means for staging comprises a programmed logic algorithm for selectively determining the priority of each said terminal address.

5. The system as recited in claim 1 wherein said means for staging integrally is connected to the centralized host computer.

6. The system as recited in claim 1, wherein said means for sending the electronic message comprises binary code.

7. The system as recited in claim 1, wherein said means for notifying said source comprises an electronic network.

* * * * *